(12) United States Patent
Musoll et al.

(10) Patent No.: US 7,707,391 B2
(45) Date of Patent: *Apr. 27, 2010

(54) METHODS AND APPARATUS FOR IMPROVING FETCHING AND DISPATCH OF INSTRUCTIONS IN MULTITHREADED PROCESSORS

(75) Inventors: Enrique Musoll, San Jose, CA (US); Mario D. Nemirovsky, Saratoga, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 11/278,874

(22) Filed: Apr. 6, 2006

(65) Prior Publication Data

US 2007/0143580 A1 Jun. 21, 2007

Related U.S. Application Data

(63) Continuation of application No. 09/616,385, filed on Jul. 14, 2000, now Pat. No. 7,035,997, which is a continuation-in-part of application No. 09/595,776, filed on Jun. 16, 2000, now Pat. No. 7,237,093, which is a continuation-in-part of application No. 09/216,017, filed on Dec. 16, 1998, now Pat. No. 6,477,562, and a continuation-in-part of application No. 09/240,012, filed on Jan. 27, 1999, now Pat. No. 6,292,888, and a continuation-in-part of application No. 09/273,810, filed on Mar. 22, 1999, now Pat. No. 6,389,449, and a continuation-in-part of application No. 09/312,302, filed on May 14, 1999, now Pat. No. 7,020,879.

(51) Int. Cl.
*G06F 9/38* (2006.01)
(52) U.S. Cl. ...................................... 712/220
(58) Field of Classification Search .................. 712/220
See application file for complete search history.

(56) References Cited

U.S. PATENT DOCUMENTS 4,197,579 A 4/1980 Forsman et al.

(Continued)

FOREIGN PATENT DOCUMENTS

EP 0 764 900 A 9/1996

(Continued)

OTHER PUBLICATIONS

U.S. Appl. No. 09/592,106, filed Jun. 12, 2000, Melvin et al.

(Continued)

*Primary Examiner*—Eric Coleman
(74) *Attorney, Agent, or Firm*—Sterne, Kessler, Goldstein & Fox P.L.L.C.

(57) ABSTRACT

In a multi-streaming processor, a system for fetching instructions from individual ones of multiple streams to an instruction pipeline is provided, comprising a fetch algorithm for selecting from which stream to fetch an instruction, and one or more predictors for forecasting whether a load instruction will hit or miss the cache or a branch will be taken. The prediction or predictions are used by the fetch algorithm in determining from which stream to fetch. In some cases probabilities are determined and also used in decisions, and predictors may be used at either or both of fetch and dispatch stages.

25 Claims, 5 Drawing Sheets

Benefits of the Technique

U.S. PATENT DOCUMENTS

| | | | |
|---|---|---|---|
| 4,200,927 A | | 4/1980 | Hughes et al. |
| 5,142,676 A | | 8/1992 | Fried et al. |
| 5,291,586 A | | 3/1994 | Jen et al. |
| 5,309,173 A | | 5/1994 | Izzi et al. |
| 5,321,823 A | | 6/1994 | Grundmann et al. |
| 5,361,337 A | | 11/1994 | Okin |
| 5,390,307 A | | 2/1995 | Yoshida |
| 5,461,722 A | * | 10/1995 | Goto .......................... 712/235 |
| 5,511,210 A | | 4/1996 | Nishikawa et al. |
| 5,535,365 A | | 7/1996 | Barriuso et al. |
| 5,542,088 A | | 7/1996 | Jennings, Jr. et al. |
| 5,546,593 A | | 8/1996 | Kimura et al. |
| 5,561,776 A | | 10/1996 | Popescu et al. |
| 5,572,704 A | | 11/1996 | Bratt et al. |
| 5,600,837 A | | 2/1997 | Artieri |
| 5,604,877 A | | 2/1997 | Hoyt et al. |
| 5,632,025 A | | 5/1997 | Bratt et al. |
| 5,649,144 A | | 7/1997 | Gostin et al. |
| 5,694,572 A | | 12/1997 | Ryan |
| 5,701,432 A | | 12/1997 | Wong et al. |
| 5,713,038 A | | 1/1998 | Motomura |
| 5,737,590 A | * | 4/1998 | Hara .......................... 712/238 |
| 5,745,778 A | | 4/1998 | Alfieri |
| 5,748,468 A | | 5/1998 | Notenboom et al. |
| 5,758,142 A | | 5/1998 | McFarling et al. |
| 5,784,613 A | | 7/1998 | Tamirsa |
| 5,812,811 A | | 9/1998 | Dubey et al. |
| 5,815,733 A | | 9/1998 | Anderson et al. |
| 5,852,726 A | | 12/1998 | Lin et al. |
| 5,860,017 A | | 1/1999 | Sharangpani et al. |
| 5,867,725 A | | 2/1999 | Fung et al. |
| 5,913,049 A | | 6/1999 | Shiell et al. |
| 5,913,054 A | | 6/1999 | Mallick et al. |
| 5,933,627 A | | 8/1999 | Parady |
| 5,946,711 A | | 8/1999 | Donnelly |
| 5,987,492 A | | 11/1999 | Yue |
| 6,016,542 A | | 1/2000 | Gottlieb et al. |
| 6,018,759 A | | 1/2000 | Doing et al. |
| 6,029,228 A | * | 2/2000 | Cai et al. .................... 711/137 |
| 6,052,708 A | | 4/2000 | Flynn et al. |
| 6,061,710 A | * | 5/2000 | Eickemeyer et al. ........ 718/107 |
| 6,076,157 A | | 6/2000 | Borkenhagen et al. |
| 6,105,127 A | | 8/2000 | Kimura et al. |
| 6,115,802 A | | 9/2000 | Tock et al. |
| 6,119,203 A | | 9/2000 | Snyder et al. |
| 6,192,384 B1 | | 2/2001 | Dally et al. |
| 6,212,544 B1 | | 4/2001 | Borkenhagen et al. |
| 6,260,077 B1 | | 7/2001 | Rangarajan et al. |
| 6,260,138 B1 | * | 7/2001 | Harris ........................ 712/239 |
| 6,266,752 B1 | * | 7/2001 | Witt et al. ................... 711/200 |
| 6,272,624 B1 | * | 8/2001 | Giacalone et al. ............ 712/239 |
| 6,292,888 B1 | | 9/2001 | Nemirovsky et al. |
| 6,308,261 B1 | | 10/2001 | Morris et al. |
| 6,356,996 B1 | | 3/2002 | Adams |
| 6,389,449 B1 | | 5/2002 | Nemirovsky et al. |
| 6,430,593 B1 | | 8/2002 | Lindsley |
| 6,442,675 B1 | | 8/2002 | Derrick et al. |
| 6,477,562 B2 | | 11/2002 | Nemirovsky et al. |
| 6,487,571 B1 | | 11/2002 | Voldman |
| 6,493,749 B2 | | 12/2002 | Paxhia et al. |
| 6,502,185 B1 | * | 12/2002 | Keller et al. ................. 712/213 |
| 6,535,905 B1 | * | 3/2003 | Kalafatis et al. ............ 718/108 |
| 6,789,100 B2 | | 9/2004 | Nemirovsky et al. |
| 6,792,524 B1 | * | 9/2004 | Peterson et al. ............. 712/235 |
| 7,020,879 B1 | | 3/2006 | Nemirovsky et al. |
| 7,035,997 B1 | | 4/2006 | Musoll et al. |
| 7,237,093 B1 | | 6/2007 | Musoll et al. |
| 7,257,814 B1 | | 8/2007 | Melvin et al. |
| 7,467,385 B2 | | 12/2008 | Nemirovsky et al. |
| 2002/0002607 A1 | | 1/2002 | Ludovici et al. |
| 2002/0062435 A1 | | 5/2002 | Nemirovsky et al. |
| 2003/0084269 A1 | | 5/2003 | Drysdale et al. |
| 2005/0081214 A1 | | 4/2005 | Nemirovsky et al. |
| 2007/0294702 A1 | | 12/2007 | Melvin et al. |
| 2008/0040577 A1 | | 2/2008 | Nemirovsky et al. |
| 2009/0125660 A1 | | 5/2009 | Nemirovsky et al. |
| 2009/0187739 A1 | | 7/2009 | Nemirovsky et al. |

FOREIGN PATENT DOCUMENTS

| | | |
|---|---|---|
| EP | 0806730 A2 | 11/1997 |
| EP | 0827071 A2 | 3/1998 |
| EP | 0953903 A2 | 11/1999 |
| GB | 2 321 984 A | 6/1998 |
| JP | 2103630 | 10/1988 |
| JP | 63254530 | 10/1988 |
| JP | 4335431 | 11/1992 |
| JP | 546379 | 2/1993 |
| JP | 09506752 A2 | 6/1997 |
| JP | 1011301 A2 | 1/1998 |
| JP | 10124316 A2 | 5/1998 |
| JP | 10207717 A2 | 8/1998 |
| WO | WO9427216 A1 | 11/1994 |
| WO | WO0023891 A1 | 4/2000 |
| WO | WO0036487 A2 | 6/2000 |

OTHER PUBLICATIONS

U.S. Appl. No. 09/595,776, filed Jun. 16, 2000, Musoll et al.

U.S. Appl. No. 09/616,385, filed Jul. 14, 2000, Musoll et al.

U.S. Appl. No. 09/629,805, filed Jul. 31, 2000, Nemirovsky et al.

Nemirovsky, Mario D., "DISC: A Dynamic Instruction Stream Computer," 1990, UMI, Ann Arbor, MI.

Diefendorff, Keith, "Compaq Chooses SMT for Alpha," Dec. 6, 1999, Microprocessor Report.

Diefendorff, Keith, "WinChip 4 Thumbs Nose At ILP," Microprocessor Report, Dec. 7, 1998, vol. 12, No. 16.

Diefendorff, Keith, "Jalapeño Powers Cyrix's M3," Microprocessor Report, Nov. 16, 1998, vol. 12, No. 15.

Slater, Michael, "Rise Joins x86 Fray with mP6," Microprocessor Report, Nov. 16, 1998, vol. 12, No. 15.

Eggers et al., "Simultaneous Multithreading: A Platform for Next-Generation Processors," IEEE Micro, Sep./Oct. 1997.

Tanenbaum, Andrew S. "Structured Computer Organization." 2nd Edition, 1984, Prentice-Hall, pp. 10-12 and 204-221.

Becker et al., "The PowerPC 601 Microprocessor," IEEE Micro, Oct. 1993.

Steere et al., "A Feedback-Driven Proportion Allocator for Real-Rate Scheduling," Proceedings of the Third Symposium on Operating Systems Design and Implementation, pp. 145-158, Feb. 1999., http://citeseer.ist.psu.edu/steere99feedbackdriven.html.

Yamamoto, Wayne, "An Analysis of Multistreamed, Superscalar Processor Architectures," University of California Santa Barbara Dissertation. Dec. 1995. Santa Barbara, US.

Cui et al., "Parallel Replacement Mechanism for MultiThread," Advances in Parallel and Distributed Computing, 1997. Proceedings, IEEE, Mar. 21, 1977, pp. 338-344.

Yamamoto et al. "Increasing Superscalar Performance Through Multistreaming." Parallel Architectures and Compilation Techniques (PACT '95). 1995.

Tullsen et al., "Simultaneous Multithreading: Maximizing on-chip parallelism," Proceedings of the 22nd Annual International Symposium on Computer Architecture, pp. 392-403, Jun. 22-24, 1995. http://citeseer.csail.mit.edu/tullsen95simultaneous.html.

The PowerPC Architecture: A Specification for a New Family of RISC Processors. 2$^{nd}$ Ed. May 1994. pp. 70-72. Morgan Kaufmann. San Francisco, US.

MC68020 32-Bit Microprocessor User's Manual, Third Edition, 1989, pp. 3-125, 3-126, and 3-127, Prentice Hall, New Jersey.

Potel, M.J., Real-Time Playback in Animation Systems, Proceedings of the 4th Annual Conference on Computer Graphics and Interactive Techniques, 1977, pp. 72-77, San Jose, CA.

ARM Architecture Reference Manual. 1996. pp. 3-41, 3-42, 3-43, 3-67, and 3-68. Prentice Hall, NJ, US.

ESA/390 Principles of Operation. IBM Online Publications Center Reference No. SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff, Keith et al. "Organization of the Motorola 88110 Superscalar RISC Microprocessor." IEEE Journal of Microelectronics. Apr. 1992. pp. 40-63. vol. 12, No. 2. IEEE. New York, NY, US.

Kane, Gerry. PA-RISC 2.0 Architecture. 1996, pp. 7-106 and 7-107. Prentice Hall. NJ, US.

Diefendorff et al. "AltiVec Extension to PowerPC Accelerates Media Processing." IEEE Journal of Microelectronics. vol. 20, No. 2 (2000): pp. 85-95.

Pai et al. "An Evaluation of Memory Consistency Models for Shared-Memory Systems with ILP Processors." Proceedings of ASPLOS-VII, Oct. 1996: pp. 12-23, ACM, Inc.

Grunewald et al. "Towards Extremely Fast Context Switching in a Block Multithreaded Processor." Proceedings of EUROMICRO 22, 1996, pp. 592-599.

Bradford et al. "Efficient Synchronization for Multithreaded Processors." Workshop on Multithreaded Execution, Architecture, and Compilation. Jan.-Feb. 1998. pp. 1-4.

Tullsen et al. Supporting Fine-Grained Synchronization on a Simultaneous Multithreading Processor, USCD CSE Technical Report CS 98-587, Jun. 1998, all pages, US.

Fiske et al. Thread prioritization: A Thread Scheduling Mechanism for Multiple-Context Parallel Processors. Proceedings of the First IEEE Symposium on High-Performance Computer Architecture. Jan. 1995. pp. 210-221. Raleigh, NC, US.

Yamamoto et al. "Performance Estimation of Multistreamed, Superscalar Processors," 27nd Annual Hawaii International Conference on Systems Sciences, 1994, pp. 195-204, IEEE.

Yoaz et al. "Speculation Techniques for Improving Load Related Instruction Scheduling," 1999, pp. 42-53, IEEE.

Kessler, R.E., "The Alpha 21264 Microprocessor: Out-of-Order Execution at 600 Mhz", Aug. 1998, COMPAQ Computer Corporation, Shrewbury, MA, USA.

Nemirovsky et al. Quantitative Study on Data Caches on a Multistreamed Architecture Proceedings of the MTEAC'98 (In conjunction with HPCA-4), Las Vegas, Nevada, Feb. 1998. http://citeseer.ist.psu.edu/nemirovsky98quantitative.html.

Li et al. Design and Implementation of a Multiple-Instruction-Stream Multiple-Execution-Pipeline Architecture. Seventh IASTED International Conference on Parallel and Distributed Computing and Systems, pp. 477-480, Oct. 1995.

Donaldson et al. "DISC: Dynamic Instruction Stream Computer, An Evaluation of Performance." 26th Hawaii Conference on Systems Sciences. vol. 1. 1993. pp. 448-456.

Thekkath et al. The Effectiveness of Multiple Hardware Contexts. In Proceedings of the 6th International Conference on Architectural Support for Programming Languages and Operating Systems, pp. 328-337, San Jose, CA, Oct. 1994. ACM.

Nemirovsky, Mario D., "DISC: Dynamic Instruction Stream Computer," ACM, 1991, pp. 163-171.

McFarling, Scott. Combining Branch Predictors. WRL Technical Note TN-36. Jun. 1993. pp. 11-12. Digital Western Research Laboratory. Palo Alto, CA, US.

Ungerer et al. A Survey of Processors with Explicit Multithreading. ACM Computing Surveys, vol. 35, No. 1. Mar. 2003. pp. 29-63.

Kapps et al. "VAX Assembly Language and Architecture." Prindle, Weber & Schmidt. Boston, 1985. pp. 239-241.

Grunewald et al. "Confidence Estimation for Speculation Control." Computer Architecture, 1998. Proceedings. The 25th Annual International Symposium on Barcelona, Spain. Jun. 27, 1998-Jul. 1, 1998. Los Alamitos, CA. USA IEEE Comput. Soc, US. pp. 122-131, XP010291387. ISBN: 0-8186-8491-7.

Oehring et al. "Simultaneous Multithreading and Multimeadia." Proceedings of the workshop on multithreaded execution, architecture and compilation. 1999, XP002462989. Orlando, FL, USA.

Kessler, R.E. et al. "The Alpha 21264 Microprocessor Architecture." Computer Design: VLSI In Computers and Processors, 1998. ICCD '98. Proceedings. International Conference on Austin, TX, USA Oct. 5-7, 1998. Los Alamitos, CA, USA, IEEE Comput. Soc, US. pp. 90-95. XP010310339. ISBN: 0-8186-9099-2.

Tullsen D.M. et al. "Exploiting Choice: Instruction Fetch and Issue on an Implementable Simultaneous Multithreading Processor." Institute of Electrical and Electronics Engineers Association for Computing Machinery. Proceedings of the 23rd Annual Symposium on Computer Architecture. Philadelphia. May 22-24, 1996. pp. 191-202. XP000679354. ISBN: 0-89791-786-3.

Jacobson et al. "Assigning Confidence to Conditional Branch Predictions." Proceedings of the 29th Annual IEEE/ACM International Symposium on Microarchitecture. Dec. 2-4, 1996. pp. 142-152. XP000724367. ISBN: 0-8186=7641-8.

Examination Report, dated Apr. 18, 2008, for European Patent Appl. No. 01952463.6, 10 pages.

"Parallel Long Move Instruction," *IBM Technical Disclosure Bulletin*, IBM Corp., New York, US, vol. 33, No. 10A, Mar. 1991, pp. 21-22, XP000109942.

Plant, J.W. and Wassel, E.R., "Data Length Calculation Hardware," *IBM Technical Disclosure Bulletin*, IBM Corp., New York, US, vol. 19, No. 1, Jun. 1, 1976, pp. 55-56, XP002333145.

Nemirovsky et al., U.S. Appl. No. 12/432,227, filed Apr. 29, 2009, entitled "Interrupt and Exception Handling for Multi-Streaming Digital Processors".

Tullsen et al., "Supporting Fine-Grained Synchronization on a Simultaneous Multithreading Processor," Proceedings of the 5th International Symposium on High Performance Computer Architecture, Jan. 1999, 5 pages.

Examination Report, dated May 14, 2009, for European Patent Appl. No. 01952463.6, 5 pages.

Office Communication, dated Dec. 3, 2003, for U.S. Appl. No. 09/592,106, filed Jun. 12, 2000, 5 pages.

Office Communication, dated Dec. 10, 2004, for U.S. Appl. No. 09/629,805, filed Jul. 31, 2000, 6 pages.

Office Communication, dated Dec. 14, 2005, for U.S. Appl. No. 09/629,805, filed Jul. 31, 2000, 8 pages.

Office Communication, dated Aug. 23, 2006, for U.S. Appl. No. 09/629,805, filed Jul. 31, 2000, 7 pages.

Office Communication, dated Feb. 8, 2007, for U.S. Appl. No. 09/629,805, filed Jul. 31, 2000, 7 pages.

Office Communication, dated Aug. 29, 2007, for U.S. Appl. No. 09/629,805, filed Jul. 31, 2000, 5 pages.

Office Communication, dated Nov. 19, 2007, for U.S. Appl. No. 09/629,805, filed Jul. 31, 2000, 5 pages.

Office Communication, dated Mar. 19, 2008, for U.S. Appl. No. 09/629,805, filed Jul. 31, 2000, 7 pages.

Office Communication, dated Aug. 7, 2008, for U.S. Appl. No. 09/629,805, filed Jul. 31, 2000, 7 pages.

Office Communication, dated Apr. 20, 2009, for U.S. Appl. No. 09/629,805, filed Jul. 31, 2000, 9 pages.

Office Communication, dated Feb. 25, 2009, for U.S. Appl. No. 10/921,077, filed Aug. 18, 2004, 8 pages.

Office Communication, dated Oct. 30, 2008, for U.S. Appl. No. 11/676,541, filed Feb. 20, 2007, 5 pages.

\* cited by examiner

| Fetch | INST A |
|---|---|
| Decode | INST B |
| Read | INST C |
| Dispatch | INST D |
| Execute | INST E |
| Access | INST F |
| Write | INST G |

*Fig. 1a*

| Fetch | INST H |
|---|---|
| Decode | INST A |
| Read | INST B |
| Dispatch | INST C |
| Execute | INST D |
| Access | INST E |
| Write | INST F |

*Fig. 1b*

| Fetch | INST I |
|---|---|
| Decode | INST H |
| Read | INST A |
| Dispatch | INST B |
| Execute | INST C |
| Access | INST D |
| Write | INST E |

*Fig. 1c*

| Fetch | INST J |
|---|---|
| Decode | INST I |
| Read | INST H |
| Dispatch | INST A |
| Execute | INST B |
| Access | INST C |
| Write | INST D |

3 ---- Br  *If (x<2) go to 9, else contin.*

4 ----

5 ----

6 ----

7 ----

8 ----

9 ----

METHODS AND APPARATUS FOR IMPROVING FETCHING AND DISPATCH OF INSTRUCTIONS IN MULTITHREADED PROCESSORS

CROSS REFERENCE TO RELATED DOCUMENTS

This application is a continuation of U.S. application Ser. No. 09/616,385, filed Jul. 14, 2000, now U.S. Pat. No. 7,035, 997, which is a continuation-in-part of U.S. application Ser. No. 09/595,776, filed Jun. 16, 2000, now U.S. Pat. No. 7,237, 093, which is a continuation-in-part of U.S. application Ser. No. 09/216,017, filed Dec. 16, 1998, now U.S. Pat. No. 6,477, 562, Ser. No. 09/240,012, filed Jan. 27, 1999, now U.S. Pat. No. 6,292,888, Ser. No. 09/273,810, filed Mar. 22, 1999, now U.S. Pat. No. 6,389,449 and Ser. No. 09/312,302, filed May 14, 1999, now U.S. Pat. No. 7,020,879, all of which are incorporated herein in their entirety by reference.

FIELD OF THE INVENTION

The present invention is in the area of microprocessors, and pertains more particularly to structure and function of simultaneous multithreaded processors.

BACKGROUND OF THE INVENTION

Multi-streaming processors capable of processing multiple threads are known in the art, and have been the subject of considerable research and development. The present invention takes notice of the prior work in this field, and builds upon that work, bringing new and non-obvious improvements in apparatus and methods to the art. The inventors have provided with this patent application an Information Disclosure Statement listing a number of published papers in the technical field of multi-streaming processors, which together provide additional background and context for the several aspects of the present invention disclosed herein.

For purposes of definition, this specification regards a stream in reference to a processing system as a hardware capability of the processor for supporting and processing an instruction thread. A thread is the actual software running within a stream. For example, a multi-streaming processor implemented as a CPU for operating a desktop computer may simultaneously process threads from two or more applications, such as a word processing program and an object-oriented drawing program. As another example, a multi-streaming-capable processor may operate a machine without regular human direction, such as a router in a packet switched network. In a router, for example, there may be one or more threads for processing and forwarding data packets on the network, another for quality-of-service (QoS) negotiation with other routers and servers connected to the network and another for maintaining routing tables and the like. The maximum capability of any multi-streaming processor to process multiple concurrent threads remains fixed at the number of hardware streams the processor supports.

A multi-streaming processor operating a single thread runs as a single-stream processor with unused streams idle. For purposes of discussion, a stream is considered an active stream at all times the stream supports a thread, and otherwise inactive. As in various related cases listed under the cross-reference section, and in papers provided by IDS, which were included with at least one of the cross-referenced applications, superscalar processors are also known in the art. This term refers to processors that have multiples of one or more types of functional units, and an ability to issue concurrent instructions to multiple functional units. Most central processing units (CPUs) built today have more than a single functional unit of each type, and are thus superscalar processors by this definition. Some have many such units, including, for example, multiple floating point units, integer units, logic units, load/store units and so forth. Multi-streaming superscalar processors are known in the art as well.

State-of-the-art processors typically employ pipelining, whether the processor is a single streaming processor, or a dynamic multi-streaming processor. As is known in the art, pipelining is a technique in which multiple instructions are queued in steps leading to execution, thus speeding up instruction execution. Most processors pipeline instruction execution, so instructions take several steps until they are executed. A brief description of typical stages in a RISC architecture is listed immediately below:

a) Fetch stage: instructions are fetched from memory
b) Decode stage: instructions are decoded
c) Read/Dispatch stage: source operands are read from register file
d) Execute stage: operations are executed, an address is calculated or a branch is resolved
e) Access stage: data is accessed
f) Write stage: the result is written in a register Pipeline stages take a single clock cycle, so the cycle must be long enough to allow for the slowest operation. The present invention is related the fact that there are situations in pipelining when instructions cannot be executed. Such events are called hazards in the art. Commonly, there are three types of hazards:

a) Structural
b) Data
c) Control

A structural hazard means that there are not adequate resources (e.g., functional units) to support the combination of instructions to be executed in the same clock cycle. A data hazard arises when an instruction depends on the result of one or more previous instructions not resolved. Forwarding or bypassing techniques are commonly used to reduce the impact of data hazards. A control hazard arises from the pipelining of branches and other instructions that change the program counter (PC). In this case the pipeline may be stalled until the branch is resolved.

Stalling on branches has a dramatic impact on processor performance (measured in instructions executed per cycle or IPC). The longer the pipelines and the wider the superscalar, the more substantial is the negative impact. Since the cost of stalls is quite high, it is common in the art to predict the outcome of branches. Branch predictors predict branches as either taken or untaken and the target address. Branch predictors may be either static or dynamic. Dynamic branch predictors may change prediction for a given branch during program execution.

A typical approach to branch prediction is to keep a history for each branch, and then to use the past to predict the future. For example, if a given branch has always been taken in the past, there is a high probability that the same branch will be taken again in the future. On the other hand, if the branch was taken 2 times, not taken 5 times, taken again once, and so forth, the prediction made will have a low confidence level. When the prediction is wrong, the pipeline must be flushed, and the pipeline control must ensure that the instructions following the wrongly guessed branch are discarded, and must restart the pipeline from the proper target address. This is a costly operation.

Multistreaming processor architectures may be either fine-grained or coarse-grained. Coarse-grained multistreaming processors typically have multiple contexts, which are used to cover long latencies arising, for example, due to cache misses. Only a single thread is executing at a given time. In contrast, fine-grained multistreaming technologies such as Dynamic Multi-Streaming (DMS), which is a development of XStream Logic, Inc., with which the present inventors are associated, allow true multi-tasking or multistreaming in a single processor, concurrently executing instructions from multiple distinct threads or tasks. DMS processors implement multiple sets of CPU registers or hardware contexts to support this style of execution.

Increasing the relative amount of instruction level parallelism (ILP) for a processor reduces data and control hazards, so applications can exploit increasing number of functional units during peak levels of parallelism, and Dynamic Multi-Streaming (DMS) hardware and techniques within today's general-purpose superscalar processors significantly improves performance by increasing the amount of ILP, and more evenly distributing it within workload. There are still occasions, however, for degraded performance due to poor selection in fetching and dispatching instructions in a DMS processor.

What is clearly needed is improved methods and apparatus for utilizing hit/miss prediction in pipelines in dynamic multi-streaming processors, particularly at the point of fetch and dispatch operations.

SUMMARY OF THE INVENTION

In a preferred embodiment of the present invention, in a multi-streaming processor, a system for fetching instructions from individual ones of the multiple streams to a pipeline is provided, comprising a fetch algorithm for selecting from which stream to fetch instructions, and a branch predictor for forecasting whether a branch alternative of a branch instruction will be taken. The prediction by the branch predictor is used by the fetch algorithm in determining from which stream to fetch.

In some embodiments a prediction that a branch will not be taken precipitates no change in the fetching process. Also, a prediction that a branch will be taken results in switching fetching to a different stream.

In some cases the branch predictor determines a probability that a branch alternative will be taken, and the probability is used by the fetch algorithm in determining from where to fetch next instructions. In other embodiments the forecast of the branch predictor is also used by a dispatch algorithm in selecting instructions from the pipeline to dispatch to functional units.

In another aspect of the invention, in a multi-streaming processor, a system for fetching instructions from individual ones of the multiple streams to a pipeline is provided, comprising a fetch algorithm for selecting from which stream to fetch instructions, and one or both of a branch predictor for forecasting whether a branch alternative of a branch instruction will be taken, or a hit-miss predictor for forecasting whether instructions will hit or miss a data cache. In this embodiment the prediction by either or both of the predictors is used by the fetch algorithm in determining from which stream to fetch.

In some embodiments a prediction that a branch will not be taken or that an instruction will hit the data cache precipitates no change in the fetching process. Also in some embodiments a prediction that a branch will be taken or that an instruction will miss a data cache results in switching fetching to a different stream.

In some cases one or both of the branch predictors determine a probability that a branch alternative will be taken or that an instruction will miss the cache, and the probability is used by the fetch algorithm in determining from where to fetch next instructions. Also, the forecast of one or both predictors may be also used by a dispatch algorithm in selecting instructions from the pipeline to dispatch to functional units.

In yet another aspect of the invention a multi-streaming processor is provided, comprising a fetch algorithm for selecting from which stream to fetch instructions, and a branch predictor for predicting whether jumps proposed by branch instructions will be taken or not. A prediction by the branch predictor is used by the fetch algorithm in determining from where stream to fetch.

In some of these embodiments a prediction that a branch will not be taken precipitates no change in the fetching process, and a prediction that a branch will be taken results in switching fetching to a different stream. The branch predictor may determine a probability for whether a branch will be taken, and the probability is used by the fetch algorithm in determining from where to fetch next instructions. In some cases the forecast of the branch predictor is also used by a dispatch algorithm in selecting instructions from the pipeline to dispatch to functional units.

In still another embodiment a multistreaming processor is provided, comprising multiple physical streams for running individual threads, a data cache, a fetch algorithm for selecting from which stream to fetch instructions, and one or both of a branch predictor for forecasting whether a branch alternative of a branch instructions will be taken, or a hit-miss predictor for forecasting whether instructions will hit or miss a data cache. The prediction by either or both of the predictors is used by the fetch algorithm in determining from which stream to fetch. In some embodiments a prediction that a branch will not be taken or that an instruction will hit the data cache precipitates no change in the fetching process, while in others a prediction that a branch will be taken or that an instruction will miss a data cache results in switching fetching to a different stream.

In some cases one or both of the branch predictors determine a probability that a branch alternative will be taken or that an instruction will miss the cache, and the probability is used by the fetch algorithm in determining from where to fetch next instructions, and the forecast of one or both predictors may be used by a dispatch algorithm in selecting instructions from the pipeline to dispatch to functional units.

Methods for practicing the invention are taught as well, and, in the various embodiments described in enabling detail below, for the first time apparatus and methods are applied to multistreaming processors to significantly improve their performance.

BRIEF DESCRIPTION OF THE DRAWING FIGURES

FIG. 1a is a simplified diagram of a pipeline in an embodiment of the present invention.

FIG. 1b shows the pipeline of FIG. 1a after a cycle.

FIG. 1c shows the pipeline of FIGS. 1a and 1b after another cycle.

FIG. 1d shows the pipeline of FIGS. 1a, 1b and 1c after yet another cycle.

DESCRIPTION OF THE PREFERRED EMBODIMENTS

Figure 2:
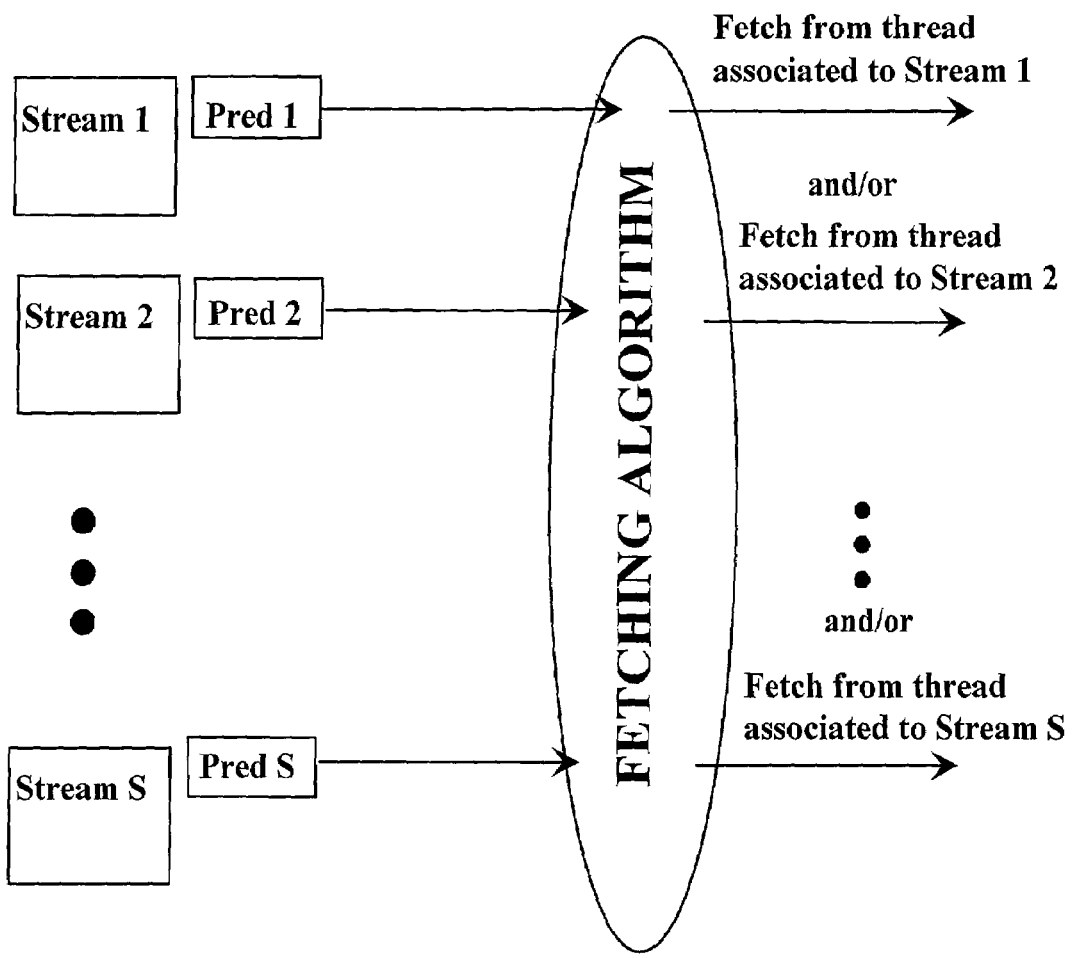
FIG. 2 is a schematic diagram associating predictors with streams in an embodiment of the present invention.

FIG. 1a is a simplified diagram of a pipeline in a dynamic, multi-streaming (DMS) processor according to an embodiment of the present invention. In this simplified view the pipeline has seven stages, which are fetch, decode, read, dispatch, execute, access and write. These are the same as described in the background section above, except for the separation of read and dispatch in FIG. 1a to illustrate the functions. Dispatch is important in the present invention in that the present invention adds intelligence to Dispatch, improving the performance of the processor. The fetch stage in the pipeline fetches instructions into the pipeline from the multiple streams, and in an embodiment of the present invention is capable of selective fetching.

Although there is no requirement in operating processors that there be instructions at each stage of a pipeline, it is often true that this is the case, and the inventors choose to illustrate each stage as occupied by a single instruction to avoid confusion in description. In many cases there will a plurality of instructions at various stages, or none at all.

In FIG. 1a the instructions in the pipeline are arbitrarily indicated as instructions A through G, at successive stages in the pipeline at one point in time. FIG. 1b shows the pipeline of FIG. 1a one cycle later. Note that instruction A has moved from fetch to decode, and the other instructions shown in FIG. 1a have moved one stage forward as well. Also, a new instruction, H, has entered the pipeline at the fetch stage.

FIG. 1c shows the same pipeline one cycle later. All instructions have moved forward one further stage, and a new instruction I has entered the pipeline at the fetch stage. FIG. 1d shows the same pipeline after yet another cycle, at which point in time the instructions have moved forward yet again, and yet another instruction J has entered the pipeline.

Note that after the fourth cycle, instruction A has moved from fetch to dispatch. Assume for the sake of this example that instruction A is a load instruction for loading a data value from cache. If this is the case, there will be some probability as to whether the particular data is in cache or not. In the art this is known as the hit/miss probability. If the data is in the cache, the system scores a hit. If not, the system scores a miss.

The combination of hit/miss probability for load operations with pipelined architecture has significance for processor efficiency, because, in the conventional case the general sequence of instructions in the pipeline will be from a single thread, and will typically be related in that many instructions following a load instruction may depend upon the result of whatever instruction is to use the data loaded. That is, until the resolution of whatever instruction is to use the data loaded, many following instructions cannot be executed, except in some cases, on a speculative basis.

Conventional processors simply assume a hit when a load instruction enters a pipeline. If the load is a miss, however, once the load instruction is executed, then it may take a number of cycles for the needed data, not in cache, to be loaded from memory. And, unfortunately, the miss will not be apparent until the load instruction is dispatched and executed. The following instructions have to stall until the data is loaded and the instruction(s) depending on the data are executed.

The present inventors provide apparatus and methods for reducing the impact of data cache misses in multithreaded architectures. The technique consists of predicting, for each of the threads running in the multiple streams of the DMS, whether the next access to the data cache will result in a miss. If this is the case, then (generally):

The stream can be given a lower priority when deciding, in the fetch stage, from which stream to fetch, and The dependent instructions of the instruction that accesses the data cache can be more efficiently dispatched to the functional units (FU's) in the dispatch stage.

This new apparatus and technique improves the performance of a multistreaming processor in the fetching and dispatching of instructions.

Fetching with Hit-Miss Prediction

The new technique takes advantage of the fact that, in DMS processor, as instructions are fetched to the pipeline from individual ones of the streams, there is freedom in choosing a fetching policy or algorithm that will select, on a cycle-by-cycle basis, from which stream instructions are to be fetched.

In a multistreaming architecture, without the technique proposed here, a typical event that causes a thread switch is a data cache miss. Since the required data may take several cycles to be available (the exact number depending on where the data really resides in the memory hierarchy of the processor), the thread that missed the data cache may be switched out since the dependent instructions of the instruction that missed most likely will not execute due to the dependencies on the data. Thus, more work can be done by fetching and executing instructions from another thread. In this case, the instructions following the one that missed, and that have already been fetched, will need to be flushed out, thus degrading the performance of the processor with respect to the case in which useful instructions had been fetched.

If the fact that an instruction will miss the data cache could be known early in the process the fetching of instructions that might eventually be flushed may be avoided by fetching, instead of the instructions following the instruction that missed the data cache, instructions from another stream, improving the likelihood that the fetched instructions may be quickly executed. Thus, a fetching algorithm, in an embodiment of the present invention, may take into account, for all the streams, the predictions on whether the next access will miss the data cache, and fetch from the stream running a thread that is most likely to have its instructions executed and committed.

There already exist in the art a variety of implementations for hit-miss predictors. The goal, however, is always the same: to predict with the highest accuracy both the hits and misses to the data cache. Moreover, a desirable property of such a predictor is to be able to predict the next access to the data cache as soon as possible so that fewer instructions (that would eventually be flushed out) will enter the pipeline.

The technique taught herein can be improved by associating a confidence level to the prediction. The predictor, in one embodiment of the invention, operating at the fetch stage, in addition to predicting also generates this confidence level value. The confidence level helps the fetching algorithm, for example, in cases in which two or more predictors predicted a miss in the data cache and one is selected to be switched out. In this case, the stream with higher confidence level will be selected.

FIG. 2 is a schematic diagram of a fetching algorithm in a multistreaming architecture. The algorithm decides from which stream(s) to fetch based on cache hit/miss predictors associated to each of the streams. In FIG. 2 a predictor is associated with streams 1, 2, and so on through stream S. Thus, theoretically, instructions from up to S streams (S being the maximum number of streams supported by the multi-streaming architecture) can be simultaneously fetched every cycle. In reality, however, the fetching algorithm might be restricted to fetch instructions from P streams (P<S) due to implementation restrictions (for example, availability of instruction cache ports). Moreover, the fetching algorithm might select from which streams to fetch based on other information (for example, confidence on the branch prediction for each stream, thread priorities, state of the pipeline, etc.)

So far, we have mentioned predictors of hit/miss for the data cache. Note that the data cache might be implemented for performance reasons in different levels (the first level—L1—being the closest to the processor core). In alternative embodiments of the invention different hit/miss predictors may exist for each of the data cache levels.

The fetching algorithm in alternative embodiments of the present invention may base selection of instructions to be fetched on the prediction for the second level—L2—of data cache since, in most processor systems, a miss in the second level of cache is very costly in number of cycles (whereas the penalty of a miss in the L1 is comparatively relatively small).

Fetching Discrimination by Branch Prediction

As was described in some detail above in the "Background" section, a control hazard arises from the pipelining of branches and other instructions that change the program counter (PC). In this case the pipeline may be stalled until the branch is resolved. The description above relates in particular to the probability of whether instructions in the pipeline will hit or miss the data cache; that is, whether the data needed to execute these instructions may or may not be in the cache. In the present case discrimination is accomplished by branch prediction, rather than cache hit-miss prediction.

Stalling on branches has a dramatic impact on processor performance (measured in instructions executed per cycle or IPC). The longer the pipelines and the wider the superscalar in a processor, the more substantial is the negative impact. Since the cost of stalls is quite high, it is common in the art in regard to single-streaming processors to predict the outcome of branches. Branch predictors predict whether a branch instruction will be taken, and may also indicate a confidence level for branch instructions and the target address if the branch is taken. Branch predictors may be either static or dynamic. Dynamic branch predictors may change prediction for a given branch during program execution.

A typical approach to branch prediction is to keep a history for each branch, and then to use the past to predict the future. For example, if a given branch has always been taken in the past, there is a high probability that the same branch will be taken again in the future. On the other hand, if the branch was taken 2 times, not taken 5 times, taken again once, and so forth, the prediction made will have a low confidence level. When the prediction is wrong, the pipeline must be flushed, and the pipeline control must ensure that the instructions following the wrongly guessed branch are discarded, and must restart the pipeline from the proper target address. This is a costly operation.

Figure 5:
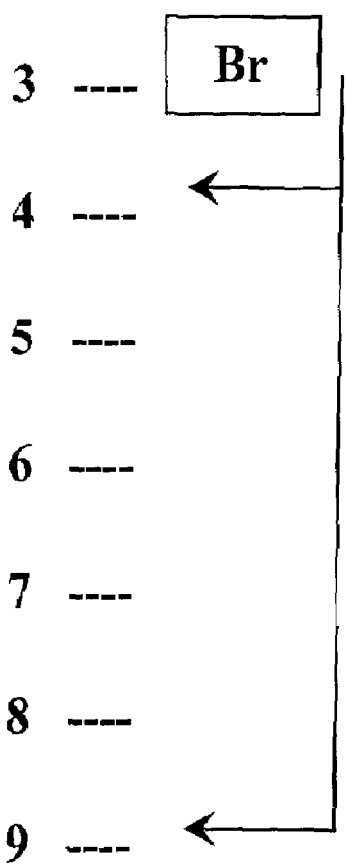
FIG. 5 is a depiction of a program counter sequence.

To further illustrate, FIG. 5 is a generic diagram of a program counter (PC) sequence for a specific thread, showing instructions 0 through 9 in sequence. Instruction 3 is a Branch instruction, specifically that if x is less than 2, jump to instruction 9, and if not, continue with the thread sequence at instruction 4. In a pipelined processor, when Br instruction 3 is fetched, since it will be some several cycles at least before it is dispatched to functional units and resolved, it would be good to know the likelihood as to whether the branch will be taken. If, at the time of fetching the branch instruction into the pipeline, a branch predictor is employed, and the likelihood that the branch will be taken is found to be high, and the target address is 9, a decision can be made to begin to fetch new instructions into the pipeline at instruction 9. If the likelihood is low, then new instructions may be fetched into the pipeline sequentially, and processor performance may be considerably improved by use of the branch predictor.

The inventors have provided, in a preferred embodiment of the present invention comprising a multi-streaming processor, a system in which a branch predictor is associated with each stream of the processor to predict, to the greatest possible degree, whether a branch will be taken, and in a preferred embodiment, the confidence level of the prediction. Output from the branch predictors is fed as input to a fetching algorithm to aid in determining from which stream to fetch instructions into the pipeline.

FIG. 2 described above in the case of hit-miss prediction may also serve to illustrate the instant case for branch prediction. Again S streams are indicated, and a predictor is associated with each stream. The predictor in this case is a branch predictor, rather than the hit-miss predictor descried above. As branch instructions are fetched and enter the pipeline in the multi-streaming processor, the branch predictor associated with each stream determines the probability that the branch will enter the pipeline. The predictions are fed as input to the fetching algorithm as shown, and the fetching algorithm may be structured to use this input, and perhaps other input as well, in making important decisions. In this case, a low probability that a branch will be taken allows the processor to continue with whatever fetching intelligence is currently in use. A high probability that a branch may be taken, if no target address is predicted, may be used to cause the fetching algorithm to begin fetching from a different stream than the stream from which the branch instruction was taken. If the probability that a branch will be taken is high, and a target address is predicted for the branch, further instructions may be fetched beginning from the target address.

For a given branch, a branch predictor predicts that a branch will be taken or not taken, and also may generate a confidence level of the prediction. In a preferred embodiment the confidence level (probability) is given by a number p between 0 (about half of the time is true) to 1 (certainty). A value close to unity means it is highly likely that the prediction will become true. In a preferred embodiment a confidence-level field (CLF) of N bits is added to the branch predictor. The N bits are a digitalization of p. For example, if N=1, CLF=0 if the confidence level is low and one otherwise; for N=2 there are 4 levels of confidence, say, from certainty to the lowest level. The fetching algorithm makes a decision based on the value of CLF such as to fetch branch instructions from streams with the highest CLF. When a branch with low value of CLF is resolved, if no fetching from that stream has taken place following the offending branch, the CLF for that branch could be upgraded to a higher value. Meanwhile, instructions from other streams were fetched maintaining resources occupied, and avoiding the risk of stalling the pipeline.

Dispatch with Hit-Miss Prediction

The technique of having a data cache hit/miss predictor is also useful in the process of deciding, at the dispatch stage in the pipeline, which instructions are to be extracted from the instruction queue (if any) and sent to the functional units (FUs) for execution.

In current art, when an instruction (henceforth called a producer) generates a read access to the data cache, the latency of the result is not known until the data cache is accessed and the hit/miss outcome is determined. The dispatch of a dependent instruction (henceforth termed a consumer) on the data generated by the producer can follow two policies:

a) Dispatch the instruction only when it is guaranteed that the data will be available.

b) Dispatch the instruction assuming that the producer will hit in the first level of the data cache.

Policy (b), then, dispatches the consumer instruction speculatively (a hit is always assumed for the producer instruction since the hit ratio in a cache is usually very high). If the consumer instruction arrives to the FU and the data is still not available, the instruction has to either stall at the FU or be rescheduled for dispatch in a later cycle (this option will allow other non-dependent instructions to be dispatched to the FU). In any case, both options degrade the performance of the processor.

Policy (a) provides the lowest performance since the consumer instruction might be unnecessarily stalled before it is dispatched. The producer instruction will be dispatched as soon as the producer hits in the data cache or, in case it misses, when the missing data arrives from the next level of memory hierarchy. On the other hand, this policy provides the simplest implementation, since no re-scheduling will occur.

In an embodiment of the present invention a hit/miss predictor enhances the performance of policy (b) by predicting whether the producer will hit in the data cache. Thus, the consumer instructions of a producer that is predicted to miss in the data cache will be dispatched following policy (a). If the producer instruction is predicted to hit, then the dispatch policy is (b). In this case, however, the re-scheduling logic is still needed in case the prediction is incorrect. Only in the case in which the prediction is a hit but the real outcome is a miss, the consumer instructions will need to be either stalled at the FUs or re-scheduled.

Figure 3:
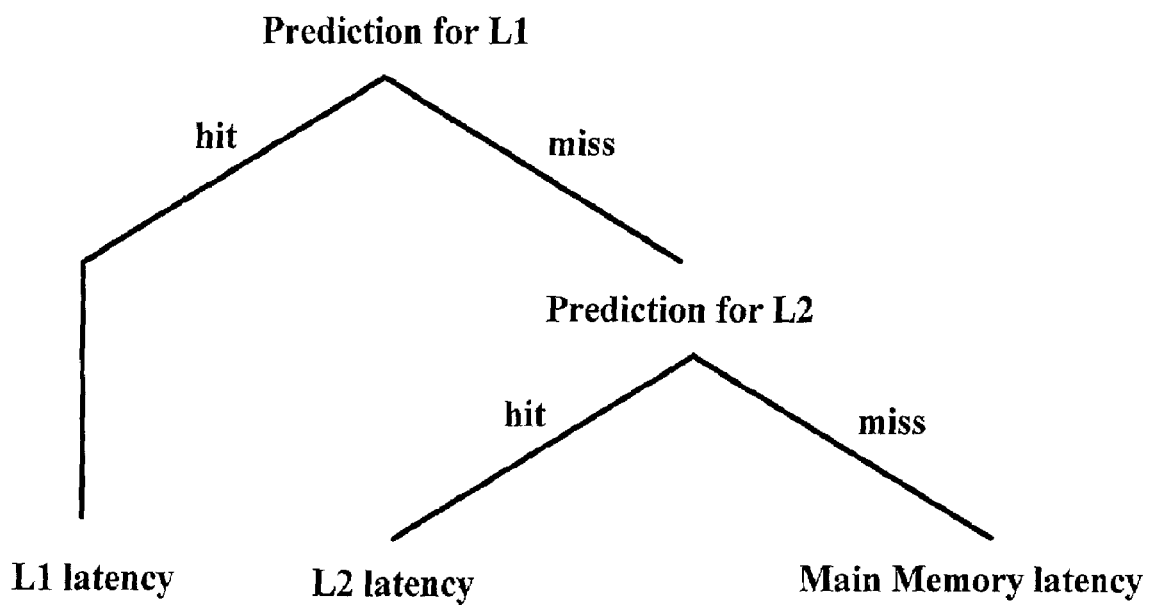
FIG. 3 is a schematic showing predictors for different levels in cache.
Figure 4:
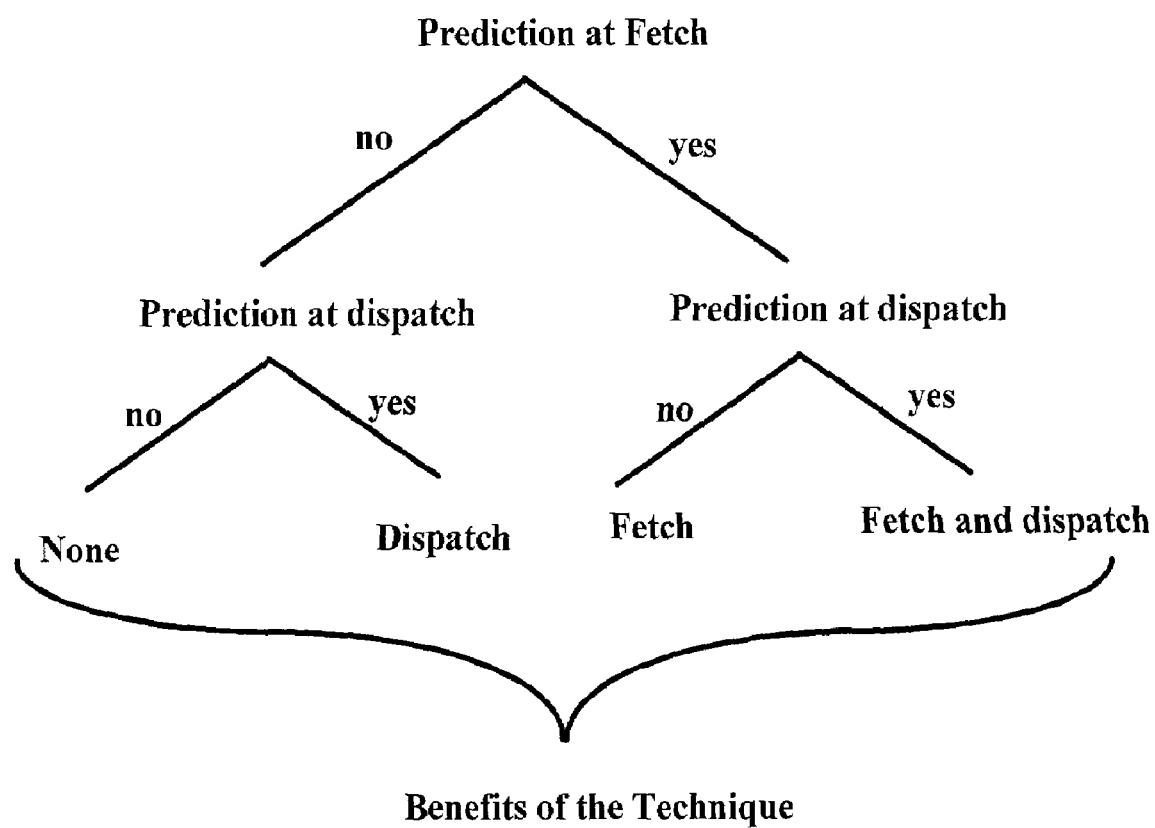
FIG. 4 is a schematic illustrating benefits of the technique in embodiments of the invention.

In general, the hit/miss predictor operating at the dispatch level optimizes the dispatch of consumer instructions by predicting the latency of the data. If a hit in the L1 is predicted, the latency of the data is predicted to be the latency of the L1 cache. If a miss is predicted, the predicted latency of the data depends on whether more levels of cache exist and on whether a hit/miss predictor exists for each of these levels. If, for example, two levels of cache exist and the hit/miss outcome of the L2 is also predicted, the predicted latency of the data is computed as shown in FIG. 3 (Note: the necessary cycles, if any, to bring the data from the output of the cache to the input of the functional unit where the consumer will be executed need to be added to the predicted latency of the data).

The benefits of a hit/miss predictor for dispatch logic are not restricted to multistreaming processors only, but in a multistreaming processor where the technique has larger benefits than in a conventional (single-streaming) processor architecture. In a conventional processor having a data hit/miss predictor, when a data cache miss is predicted, no instructions (in case of an in-order dispatch engine), or only those that do not depend on the missing data (in case of an out-of-order dispatch engine) can execute. In any case, the processor resources might be idle for several cycles until the missing data is available. In multistreaming processors those idle cycles can be used to execute other instructions from other threads since they do not depend on the missing data. Thus, for a multistreaming processor, the benefits of a data cache hit/miss predictor are twofold as shown in FIG. 3.

Discrimination at Dispatch by Branch Prediction

Discrimination at the dispatch stage in a multi-streaming processor using hit-miss prediction is described above. Branch prediction can be used at the dispatch stage as well to improve processor performance. In a preferred embodiment, wherein branch prediction is used at the fetch stage as input to a fetch algorithm as described above, for every branch that enters the pipeline a there will be a prediction, possibly with an attached probability, for the branch instruction. This information may be retained and passed from the fetch algorithm to a dispatch algorithm, and used in selective dispatching of instructions fetched right after the branch instruction. In one simple case, for example, the instructions following a high probability branch instructions may be given preference in dispatch versus other instructions.

In an alternative embodiment, wherein fetch discrimination is not employed, discrimination at the dispatch stage may still be used. It will be apparent to the skilled artisan, once given the teachings herein, that hit-miss and branch prediction may be done singly or in tandem at either or both of fetch and dispatch stages in a pipelined processor.

In alternative embodiments of the invention the prediction can be done differently at the fetch and dispatch stages (i.e. using different information on which to base the prediction and/or using a different prediction algorithm). As an example, the hit-miss prediction at the dispatch stage could use the program counter (PC) address of the consumer instruction (since the instruction has already been decoded and its PC is known) and could follow an algorithm similar to the prediction schemes used in branch prediction. The prediction at the fetch stage may use another type of address (cache line, for example) or other non-address information.

The prediction algorithm in different embodiments may vary depending on the workload that the processor has to efficiently support. For traditional applications, like Windows programs or SPEC benchmarks, similar algorithms to those used in branch prediction may produce the desired prediction accuracy in both hits and misses for the hit-miss case. For other types of workloads, like packet processing applications in network processors, the predictors can take advantage of additional information, like the flow number to which the packet being processed belongs (the data cache accesses performed by the processing of the first packet(s) of a new flow most likely will miss).

It will be apparent to the skilled artisan that there are many alterations that might be made in the embodiments of the invention taught herein without departing from the spirit and scope of the invention. The predictors may be implemented in various ways, for example, and different actions may be taken based on assigned probabilities. Further, the predictors may be used at different levels in a pipeline. For example, a predictor may have input from a decode stage, and output to a fetch algorithm. Further, the mechanisms to accomplish different embodiments of the invention may be implemented typically in either hardware or software. There are similarly many other alterations that may be made within the spirit and scope of the invention. The invention should be accorded the scope of the claims below.

What is claimed is:

1. A processor, comprising:
 a fetch stage configured to convey a branch prediction corresponding to a branch instruction; and
 a dispatch stage configured to:
  receive the branch prediction; and
  utilize said branch prediction for a determination of which instructions to dispatch to one or more execution units.

2. The processor as recited in claim 1, wherein said instructions are instructions fetched subsequent to a fetch of the branch instruction.

3. The processor as recited in claim 2, wherein, in response to the determination, said branch prediction indicates a taken branch and the dispatch stage is configured to give said instructions preference in a dispatch.

4. The processor as recited in claim 2, wherein branch predictions received by the dispatch stage include a confidence level, and wherein the dispatch stage is configured to give preference in a dispatch to instructions following a branch predicted taken with a high level of confidence over a branch predicted taken with a low level of confidence.

5. The processor as recited in claim 3, wherein the branch prediction further comprises a branch target.

6. The processor as recited in claim 1, wherein the branch prediction is used by the fetch stage to determine from which of said multiple processor streams to fetch.

7. A processing system comprising:
a plurality of processor streams; and
a pipeline including at least a fetch stage and a dispatch stage;
wherein the fetch stage is configured to convey a branch prediction corresponding to a branch instruction; and
the dispatch stage is configured to:
receive the branch prediction; and
utilize said branch prediction for a determination of which instructions to dispatch to one or more execution units.

8. The system as recited in claim 7, wherein said instructions are instructions fetched subsequent to a fetch of the branch instruction.

9. The system as recited in claim 8, wherein, in response to the determination, said branch prediction indicates a taken branch and the dispatch stage is configured to give said instructions preference in a dispatch.

10. The system as recited in claim 8, wherein branch predictions received by the dispatch stage include a confidence level, and wherein the dispatch stage is configured to give preference in a dispatch to instructions following a branch predicted taken with a high level of confidence over a branch predicted taken with a low level of confidence.

11. The system as recited in claim 9, wherein the branch prediction further comprises a branch target.

12. The system as recited in claim 7, wherein the branch prediction is used by the fetch stage to determine from which of said multiple processor streams to fetch.

13. A method for use in a processor, the method comprising:
conveying a branch prediction corresponding to a branch instruction from a fetch stage of a pipeline;
receiving the branch prediction in a dispatch stage of the pipeline; and
utilizing said branch prediction in the dispatch stage for a determination of which instructions to dispatch to one or more execution units;
wherein the processor has multiple processor streams.

14. The method as recited in claim 13, wherein said instructions are instructions fetched subsequent to a fetch of the branch instruction.

15. The method as recited in claim 14, wherein, in response to the determination, said branch prediction indicates a taken branch, the method further comprising giving said instructions preference in a dispatch.

16. The method as recited in claim 15, wherein branch predictions received by the dispatch stage include a confidence level, and wherein the method further comprises giving preference in a dispatch to instructions following a branch predicted taken with a high level of confidence over a branch predicted taken with a low level of confidence.

17. The method as recited in claim 14, wherein the branch prediction further comprises a branch target.

18. The method as recited in claim 13, further comprising using the branch prediction in the fetch stage to determine from which of said multiple processor streams to fetch.

19. A pipelined processor having multiple hardware streams supporting multiple threads, and a data cache, the processor comprising:
multiple hit/miss predictors, each associated with a corresponding one of the multiple hardware streams that supports a corresponding thread from a corresponding application, wherein each of said multiple hit/miss predictors forecasts whether instructions from the corresponding one of the multiple hardware streams will hit or miss the data cache; and
a fetch stage of a pipeline including at least said fetch stage and a dispatch stage, wherein the fetch stage is configured to utilize said multiple hit/miss predictors to determine which of the multiple hardware streams from which to fetch instructions for subsequent conveyance to said dispatch stage.

20. The processor as recited in claim 19, wherein the dispatch stage is configured to dispatch instructions for said multiple threads according to a priority record, regardless of any priority associated with the multiple threads.

21. The processor as recited in claim 19, wherein said multiple hit/miss predictors further comprise one or more branch predictors which are utilized by the fetch stage in determining which of the multiple hardware streams from which to fetch instructions.

22. The processor as recited in claim 19, wherein said multiple hit/miss predictors forecast whether said instructions from said corresponding one of the multiple hardware streams will hit or miss said data cache prior to when said instructions enter into said dispatch stage.

23. A method for use in a pipelined processor having multiple hardware streams supporting multiple threads, and a data cache, the method comprising:
maintaining multiple hit/miss predictors, each associated with a corresponding one of the multiple hardware streams that supports a corresponding thread from a corresponding application, wherein each of said multiple hit/miss predictors forecasts whether instructions from the corresponding one of the multiple hardware streams will hit or miss the data cache; and
utilizing said multiple hit/miss predictors in a fetch stage of a pipeline which includes at least said fetch stage and a dispatch stage, wherein said multiple hit/miss predictors are utilized to determine which of the multiple hardware streams from which to fetch instructions for subsequent conveyance to said dispatch stage.

24. The method as recited in claim 23, further comprising dispatching instructions for said multiple threads according to a priority record, regardless of any priority associated with the multiple threads.

25. The method as recited in claim 23, further comprising maintaining branch prediction indications as part of said multiple hit/miss predictors, and utilizing said branch prediction indications at the fetch stage in determining which of the multiple hardware streams from which to fetch instructions.

* * * * *

UNITED STATES PATENT AND TRADEMARK OFFICE
CERTIFICATE OF CORRECTION

PATENT NO. : 7,707,391 B2  Page 1 of 1
APPLICATION NO. : 11/278874
DATED : April 27, 2010
INVENTOR(S) : Enrique Musoll et al.

It is certified that error appears in the above-identified patent and that said Letters Patent is hereby corrected as shown below:

Title page;

In column 1 of the first page of the patent, INID code (63), please replace:

"Continuation of application No. 09/616,385, filed on Jul. 14, 2000, now Pat. No. 7,035,997, which is a continuation-in-part of application No. 09/595,776, filed on Jun. 16, 2000, now Pat. No. 7,237,093, which is a continuation-in-part of application No. 09/216,017, filed on Dec. 16, 1998, now Pat. No. 6,477,562, and a continuation-in-part of application No. 09/240,012, filed on Jan. 27, 1999, now Pat. No. 6,292,888, and a continuation-in-part of application No. 09/273,810, filed on Mar. 22, 1999, now Pat. No. 6,389,449, and a continuation-in-part of application No. 09/312,302, filed on May 14, 1999, now Pat. No. 7,020,879."

with:

--Continuation of application No. 09/616,385, filed on Jul. 14, 2000, now Pat. No. 7,035,997, which is a continuation-in-part of application No. 09/595,776, filed on Jun. 16, 2000, now Pat. No. 7,237,093, which is a continuation-in-part of application No. 09/216,017, filed on Dec. 16, 1998, now Pat. No. 6,477,562, and a continuation-in-part of application No. 09/240,012, filed on Jan. 27, 1999, now Pat. No. 6,292,888, and a continuation-in-part of application No. 09/273,810, filed on Mar. 22, 1999, now Pat. No. 6,389,449, and a continuation-in-part of application No. 09/312,302, filed on May 14, 1999, now Pat. No. 7,020,879.
Said application No. 09/273,810, filed on Mar. 22, 1999, now Pat. No. 6,389,449, is a continuation-in-part of 09/216,017, filed on Dec. 16, 1998, now Pat. No. 6,477,562, and is a continuation-in-part of application No. 09/240,012, filed Jan. 27, 1999, now Pat. No. 6,292,888.
Said application No. 09/312,302, filed May 14, 1999, now Pat. No. 7,020,879, is a continuation-in-part of application No. 09/216,017, filed Dec. 16, 1998, now Pat. No. 6,477,562, and is a continuation-in-part of 09/240,012, filed Jan. 27, 1999, now Pat. No. 6,292,888, and is a continuation-in-part of application No. 09/273,810, filed Mar. 22, 1999, now Pat. No. 6,389,449.--

Signed and Sealed this

Twenty-third Day of November, 2010

David J. Kappos
*Director of the United States Patent and Trademark Office*